(12) United States Patent
Guo et al.

(10) Patent No.: US 10,715,920 B2
(45) Date of Patent: Jul. 14, 2020

(54) ELECTRONIC DEVICE

(71) Applicant: AAC Technologies Pte. Ltd., Singapore (SG)

(72) Inventors: Shun Guo, Shenzhen (CN); Huan Ge, Shenzhen (CN); Chengxia Ji, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 0 days.

(21) Appl. No.: 16/233,370

(22) Filed: Dec. 27, 2018

(65) Prior Publication Data

US 2019/0230444 A1     Jul. 25, 2019

(30) Foreign Application Priority Data

Jan. 19, 2018   (CN) .......................... 2018 1 0053580

(51) Int. Cl.
| | |
|---|---|
| *H04R 9/06* | (2006.01) |
| *H04M 1/02* | (2006.01) |
| *H04R 9/02* | (2006.01) |
| *H04R 7/20* | (2006.01) |
| *H04R 7/02* | (2006.01) |
| *H04R 7/04* | (2006.01) |
| *H04R 17/00* | (2006.01) |

(52) U.S. Cl.
CPC ............ *H04R 9/06* (2013.01); *H04M 1/0266* (2013.01); *H04R 7/20* (2013.01); *H04R 9/02* (2013.01); *H04R 7/02* (2013.01); *H04R 7/04* (2013.01); *H04R 17/00* (2013.01); *H04R 2400/11* (2013.01); *H04R 2499/11* (2013.01)

(58) Field of Classification Search
CPC ... H04R 9/06; H04R 9/02; H04R 7/04; H04R 7/02; H04R 2400/11; H04M 1/0266; H04M 1/0295; H04M 1/0268
See application file for complete search history.

(56) References Cited

U.S. PATENT DOCUMENTS 9,740,288 B2 *   8/2017   Hiraoka .................. G06F 3/016
9,846,454 B2 *  12/2017   Takizawa .............. G06F 1/1643
(Continued)

OTHER PUBLICATIONS

1st Office Action dated Nov. 26, 2019 by CNIPA in related Chinese Patent Application No. 201810053580.9 (14 Pages).

*Primary Examiner* — Fan S Tsang
*Assistant Examiner* — Angelica M McKinney
(74) *Attorney, Agent, or Firm* — IPro, PLLC; Na Xu

(57) ABSTRACT

The present disclosure relates to the field of electronic technologies, and discloses an electronic device. The electronic device includes a vibration plate, and a frame for supporting the vibration plate. The frame includes a supporting portion opposite to and parallel to the vibration plate, and a border bent at an edge of the supporting portion and extending along the edge in two opposite directions. The vibration plate is supported by the supporting portion and a gap is reserved between the vibration plate and the border. An actuator is fixed to a surface of the vibration plate facing the supporting portion, and the actuator drives the vibration plate to vibrate and sound. A damper is provided between the vibration plate and the supporting portion. Compared with the prior art, the electronic device provided by the present disclosure can alleviate the vibration of the frame during sounding.

18 Claims, 5 Drawing Sheets

(56) References Cited

U.S. PATENT DOCUMENTS

| | | | |
|---|---|---|---|
| 10,048,789 B2* | 8/2018 | Filiz | G06F 3/0412 |
| 2009/0054115 A1* | 2/2009 | Horrdin | G06F 1/1616 |
| | | | 455/575.8 |
| 2012/0056826 A1 | 3/2012 | Kim et al. | |
| 2013/0250502 A1* | 9/2013 | Tossavainen | G06F 3/016 |
| | | | 361/679.01 |
| 2014/0091536 A1* | 4/2014 | Bae | H05K 5/06 |
| | | | 277/641 |
| 2015/0220116 A1* | 8/2015 | Kemppinen | G06F 3/041 |
| | | | 361/679.01 |

\* cited by examiner

ELECTRONIC DEVICE

CROSS-REFERENCE TO RELATED APPLICATIONS

The present application claims priority to Chinese Patent Application No. 201810053580.9 filed on Jan. 19, 2018, the content of which is incorporated herein by reference in its entirety.

TECHNICAL FIELD

The present disclosure relates to the field of electronic technologies, and in particular, to an electronic device.

BACKGROUND

With the wide applications of electronic devices such as mobile phones and tablet computers in daily life, people has increasingly higher requirement on safety performance of the electronic devices, such as waterproofness. A vibration sounding technology is known in the prior art, in which a driver is configured to drive a shell and a screen of the electronic device to vibrate and together to sound. Compared with a conventional sounding by using a speaker, it is unnecessary to provide a sounding aperture in the shell of the electronic device in the sounding technique with the vibration of the shell, thereby greatly improving the waterproofness of the electronic device.

However, the applicant found that, although the waterproofness of the electronic device can be improved with the vibration sounding technology, the driver would drive a frame of the electronic device to vibrate together while the electronic device is sounding, and in view of this, the vibration is perceptible to users who hold the electronic device through the frame, thereby affecting the user experience.

DESCRIPTION OF EMBODIMENTS

In order to illustrate purpose, technical solutions, and advantages of the embodiments of the present disclosure, the technical solutions in the embodiments of the present disclosure are described as follow with reference to the accompanying drawings. It should be understood by those skilled in the art that in the embodiments of the present disclosure, numerous technical details are described for illustrating the present disclosure. However, the technical solutions described in the present disclosure can be implemented without these technical details and various changes and modifications based on the following embodiments.

Figure 1:
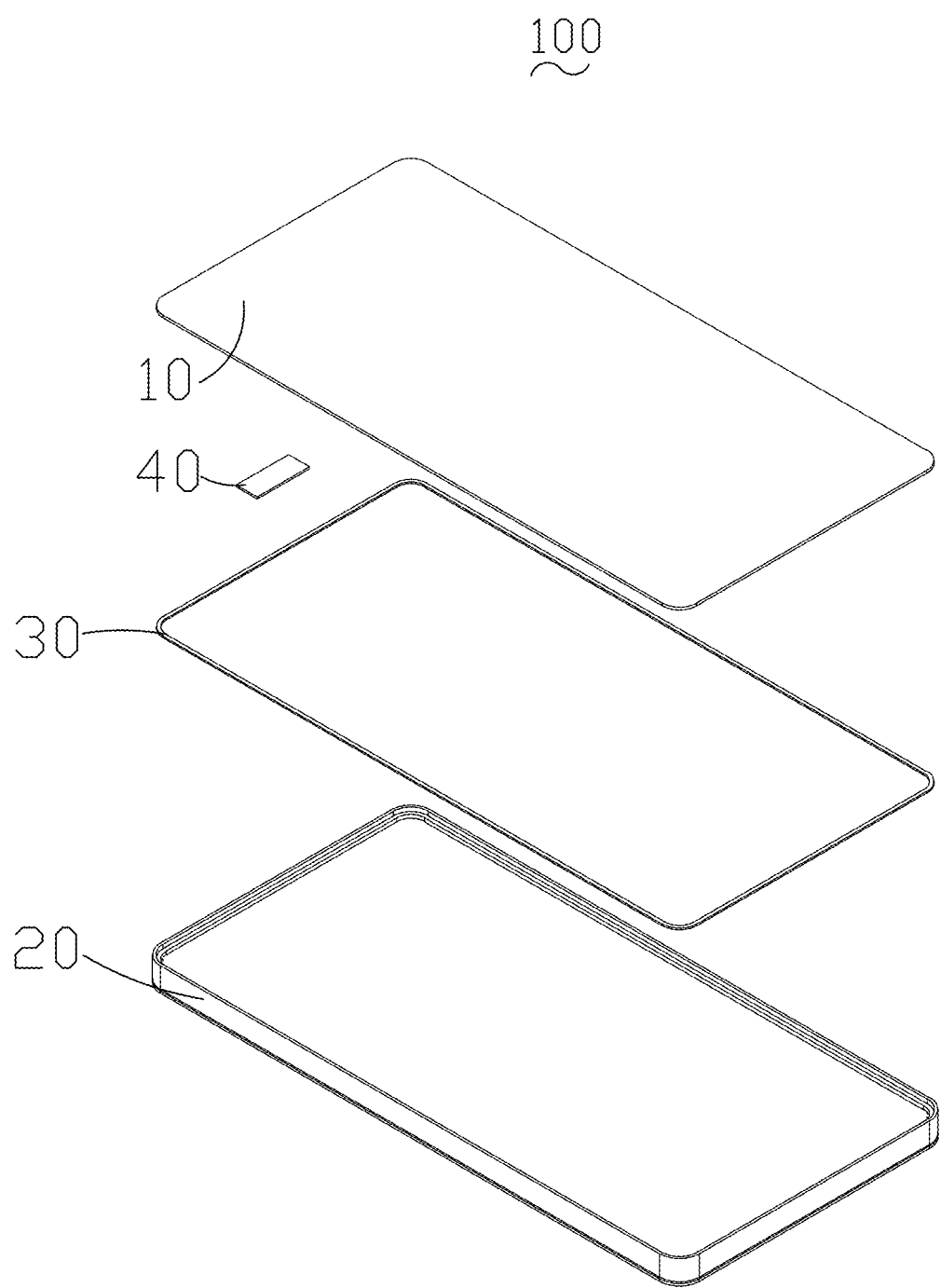
FIG. 1 is an exploded structural view of an electronic device according to a first embodiment of the present disclosure.
Figure 2:
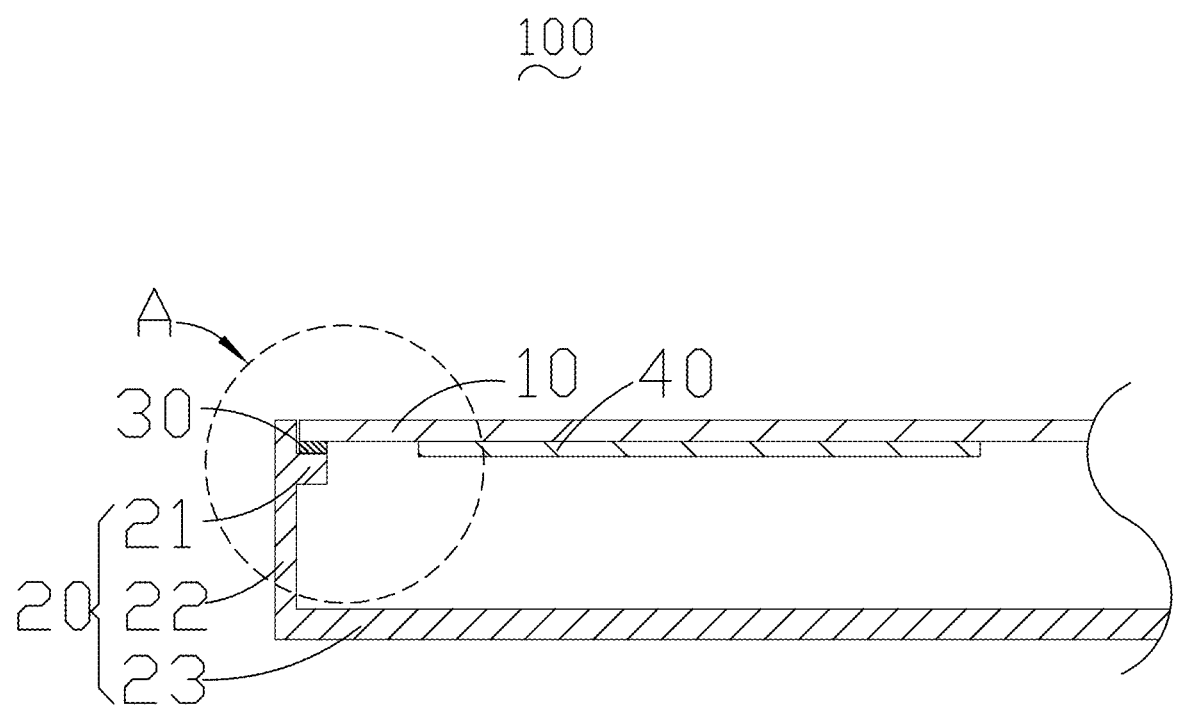
FIG. 2 is a cross-sectional structural view of an electronic device according to a first embodiment of the present disclosure.
Figure 3:
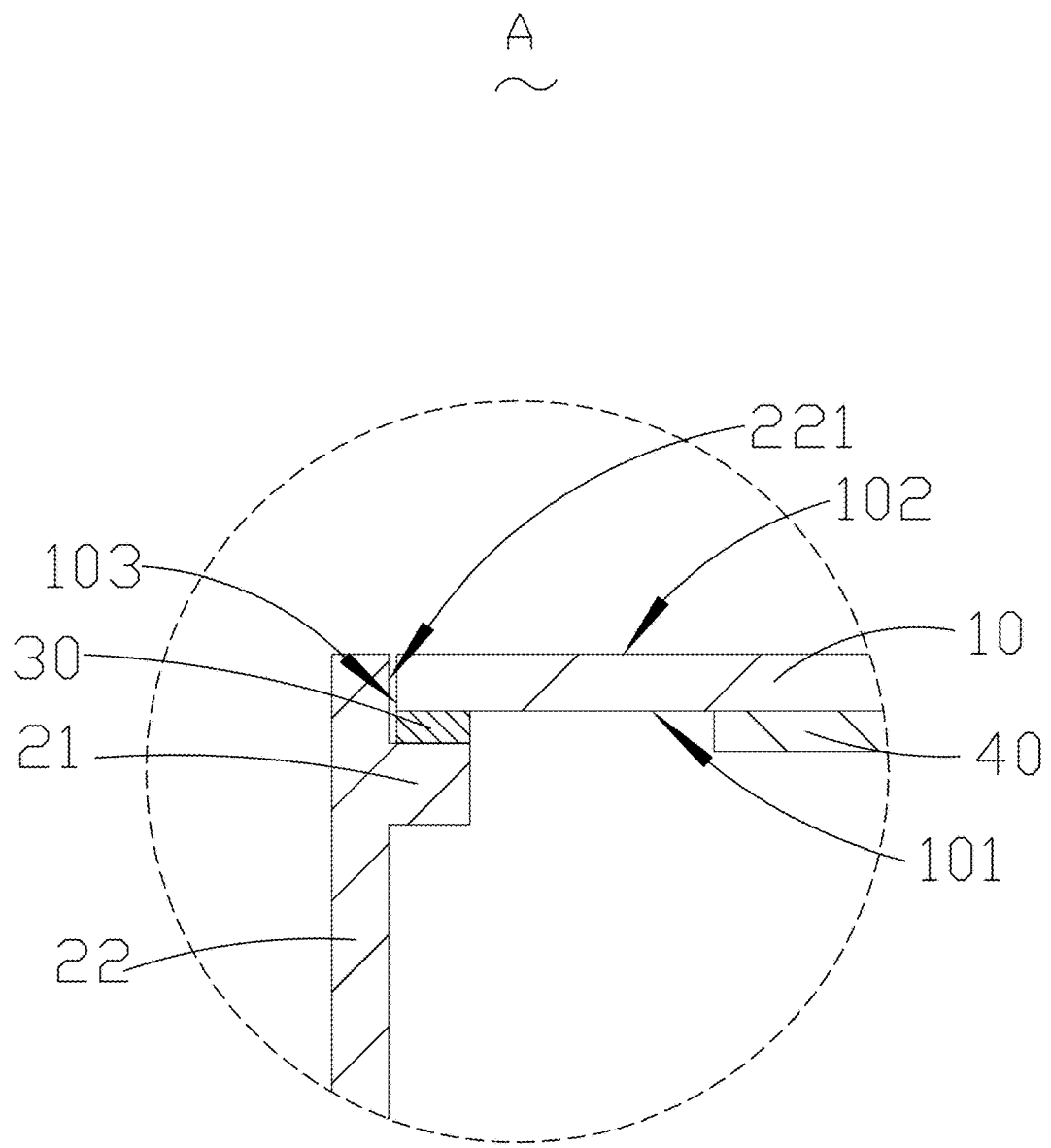
FIG. 3 is an enlarged view of portion A shown in FIG. 2.

A first embodiment of the present disclosure relates to an electronic device 100. As shown in FIGS. 1 and 2, the electronic device includes a vibration plate 10, and a frame 20 for supporting the vibration plate 10. Specifically, the frame 20 and the vibration plate 10 are fitted and fixed together to construct an exterior structure of the electronic device 100. The frame 20 includes a supporting portion 21 that is parallel to and opposite to the vibration plate 10, and a border 22 bent at an edge of the supporting portion 21 and extending along the edge in two opposite directions. The vibration plate 10 is supported by the supporting portion 21 and a pre-set gap is reserved between the vibration plate 10 and the border 22. As shown in FIG. 3, a damper 30 is provided between the vibration plate 10 and the supporting portion 21, and an actuator 40 is fixed to a surface of the vibration plate 10 facing the supporting portion 21. The actuator 40 drives the vibration plate 10 to vibrate and sound. Specifically, when the actuator 40 vibrates, the vibration plate 10 fixed thereto vibrates together to sound. In the present disclosure, the actuator 40 can be a piezoelectric actuator, or an electromagnetic actuator including a stator and a vibrator.

Compared with the prior art, since the damper 30 is sandwiched between the vibration plate 10 and the supporting portion 21 in the present embodiment, a damping effect of the damper 30 arranged between the vibration plate 10 and the supporting portion 21 can reduce the vibration transmission from the vibration plate 10 to the supporting portion 21 when the actuator 40 drives the vibration plate 10 to vibrate. At the same time, due to the presence of the pre-set gap reserved between the vibration plate 10 and the border 22, the vibration of the vibration plate 10 merely can be transmitted through the damper 30, rather than be directly transmitted to the border 22. In addition, the vibration transmitted to the border 22 is very slight after being damped by the damper 30. In this way, the vibration sense at the border of the electronic device can be significantly reduced, thereby avoid undesired influence on the user experience.

The structure of the electronic device 100 provided by the present embodiment of the present disclosure is described in detail as follow. However, it should be noted that the description herein is merely an exemplary implementation of the present disclosure, and the structure can vary with respect to forms and details depending upon practical applications, rather than be limited to the specific structures described as follow.

Specifically, in the present embodiment, the vibration plate 10 can be a display screen for displaying images and colors, or a display module including a touch screen and a display screen. The actuator 40 is configured to drive the display screen or the display module to vibrate together, so that the display screen that is merely used for displaying can also sound. In this way, the display screen is endowed with new function in addition to the original display function, a sounding aperture structure required in the existing sounding device can be omitted, thereby improving the waterproofness of the electronic device.

In the present embodiment, the vibration plate 10 includes a lower surface 101 close to the damper 30 and being in contact with the damper 30, an upper surface 102 disposed opposite to the lower surface 101 and facing away from the damper 30, and an outer periphery 103 connecting the upper surface 102 with the lower surface 101. The outer periphery 103 is opposite to an inner side wall 221 of the border 22 and spaced apart from the inner side wall 221 of the border 22, and the vibration plate 10 is not in a direct contact with the border 22, so that the vibration of the vibration plate 10 for sounding cannot be directly transmitted to the border 22. In this way, an amplitude of the vibration transmitted to the border 22 is reduced, i.e., the vibration of the frame 20 is reduced when the electronic device 100 is sounding.

It should be noted that the damper 30 is glued and fixed to the vibration plate 10 and the supporting portion 21, respectively. Specifically, the damper 30 has one side glued and fixed to the vibration plate 10, and another side glued and fixed to the supporting portion 21. In this way, the vibration plate 10 is fixed to the supporting portion 21. The damper 30 can be made of a vibration-absorptive material, such as rubber, fiberglass cloth, polymer vibration-absorptive material, etc. In this embodiment, the damper 30 in annular shape is glued and fixed to the vibration plate 10. It should be understood that the damper 30 can be a plurality of discrete vibration-absorptive blocks glued and fixed to the vibration plate 10, which does not affect the vibration-absorptive effect. It should be noted that a ratio of a Young's modulus of the damper 30 to a thickness of the damper 30 in a direction perpendicular to the vibration plate 10 is less than or equal to 2 MPa/mm. The smaller a stiffness coefficient K of the damper 30 in the direction perpendicular to the vibration plate 10 is, the better the vibration-absorptive effect is. The thickness D of the damper 30 in the direction perpendicular to the vibration plate 10 is in a negative correlation with the stiffness coefficient K, and the Young's modulus is a positive correlation with the stiffness coefficient K. Studies have shown that, when the ratio Y/D of the Young's modulus Y to the thickness D is less than or equal to 2 MPa/mm, the damper 30 has the optimal vibration-absorptive effect. Therefore, in this embodiment, the optimal vibration-absorptive effect can be achieved, without affecting the user experience.

In this embodiment, the actuator 40 is arranged on the lower surface 101, and an orthographic projection of the supporting portion 21 on the lower surface 101 does not overlap with an orthographic projection of the actuator 40 on the lower surface 101. It should be understood by those skilled in the art that, the orthographic projection of the supporting portion 21 on the lower surface 101 not overlapping with the orthographic projection of the actuator 40 on the lower surface 101 indicates that the actuator 40 is not in a direct connection with the supporting portion 21 or the damper 30. In this regard, when the actuator 40 vibrates, the vibration cannot be directly transmitted to the supporting portion 21 or the damper 30, thereby reducing the vibration of the frame 20 and improving the user experience.

The frame 20 configured to support the vibration plate 10 can be made of plastic, metal, etc., and the specific material can vary depending upon the specific design of the electronic device. Specifically, the frame 20 includes a supporting portion 21 parallel to and opposite to the vibration plate 10, a border 22 bent at an edge of the supporting portion 21 and extending along the edge in two opposite directions, and a rear shell 23 connect to an end of the border 22 facing away from the vibration plate 10. Specifically, the border 22 has an inner side wall 221, and the supporting portion 21 is a protrusion extending from the inner side wall 221 of the border 22 in a direction away from the border 22. The damper 30 is disposed on the supporting portion 21, and the supporting portion 21 indirectly supports the vibration plate 10 via the damper 30. Since the rear shell 23 of the border 22 is generally close to a handheld position of the electronic device user, when the supporting portion 21 is disposed on the inner side wall 211 of the border 22 and the damper 30 is placed on the supporting portion 21, the damper 30 is in a direct contact with the vibration plate 10 (a vibration source) can be arranged far away from the rear shell 23, so that the vibration energy transmitted to the border 22 and the rear shell 23 can be further reduced, thereby alleviating the vibration sense and improving the user experience.

Preferably, the supporting portion 21 extends in a direction perpendicular to the border 22, i.e., the supporting portion 21 is perpendicular to the border 22, which simplifies a production of the frame 20 while ensuring the structural strength of the frame 20. In the present embodiment, the supporting portion 21 in an annular shape is disposed on the inner side wall 221 of the border 22. It should be understood that the supporting portion 21 can also be a plurality of protrusion blocks distributed on the inner side wall 221 of the border 22. In this way, the support function of the supporting portion 21 on the damper 30 is not be affected, while the material of the border is saved and thus the weight of the border is reduced. The arrangement is flexible in actual production.

Figure 4:
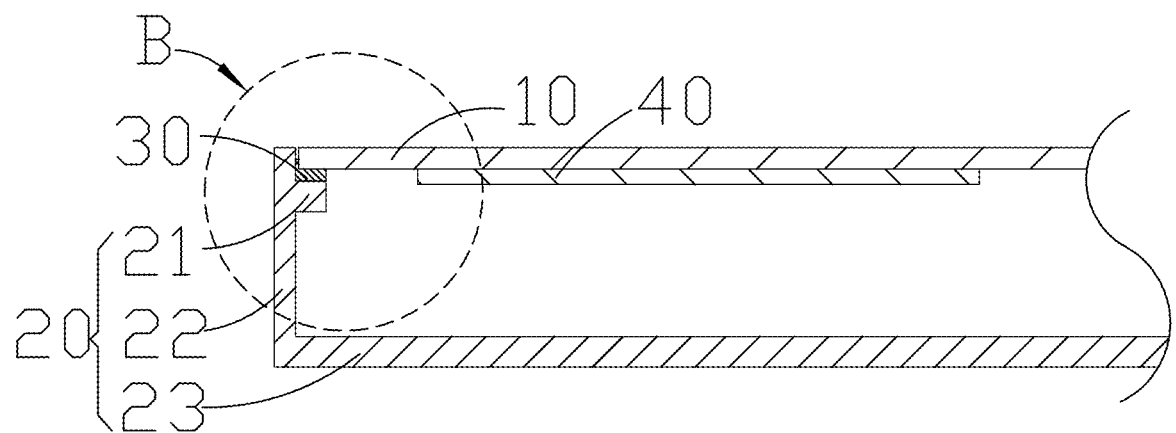
FIG. 4 is a cross-sectional structural view of an electronic device according to a second embodiment of the present disclosure.
Figure 5:
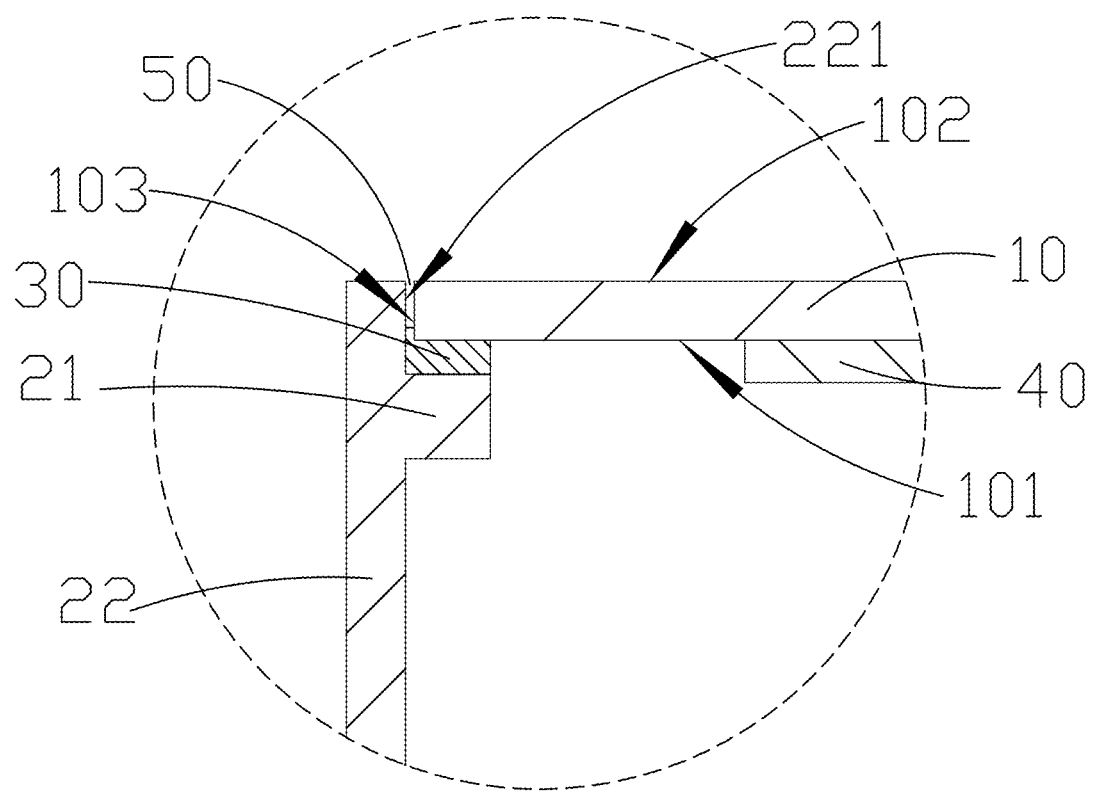
FIG. 5 is an enlarged view of portion B shown in FIG. 4.

FIGS. 4-5 illustrate an electronic device 200 according to a second embodiment of the present disclosure. The second embodiment is substantially the same as the first embodiment, i.e., the electronic device 200 also includes components such as the vibration plate 10, the frame 20, and the damper 30. The second embodiment differs from the first embodiment in that the damper 30 extends from the lower surface 101 to a gap remained between the outer periphery 103 of the vibration plate 10 and the inner side wall 221 of the border 22, as shown in FIGS. 4 and 5. It should be understood that the outer periphery 103 is opposite to the inner side wall 221 of the border 22, and a gap 50 is reserved therebetween. The damper 30 may not extend into the gap 50, or extend into the gap 50 and fill a part of the gap 50, or extend into the gap 50 and fill the entire space of the gap 50, which can be adjusted depending upon requirements in the actual production process. When the damper 30 extends into the gap reserved between the outer periphery 103 and the inner side wall 221 of the border 22, a contact area between the damper 30 and the vibration plate 10 and a contact area between the damper 30 and the border 22 both can be enlarged, which enhances the fixing effect with the vibration plate 10 and the border 22, thereby improving the stability of the electronic device.

It should be understood by those skilled in the art that the above embodiments are merely specific examples of the present disclosure, and various modification with respect to forms and details can be made without departing from the scope of the present disclosure.

What is claimed is:
1. An electronic device, comprising:
   a vibration plate; and
   a frame for supporting the vibration plate, wherein the frame comprises a supporting portion opposite to and parallel to the vibration plate and a border bent at an edge of the supporting portion and extending along the edge in
   two opposite directions, and the vibration plate is supported by the supporting portion and a gap is reserved between the vibration plate and the border;
   an actuator fixed to a surface of the vibration plate facing the supporting portion and configured to drive the vibration plate to vibrate and sound; and
   a damper sandwiched between the vibration plate and the supporting portion;
   wherein the supporting portion extends in a direction perpendicular to the border;
   the vibration plate is a display screen, and the frame further comprises a rear shell fixed to a side of the border facing away from the vibration plate;

the display screen comprises: a lower surface close to the damper and being in contact with the damper; an upper surface opposite to the lower surface and facing away from the damper; and an outer periphery connecting the upper surface with the lower surface, and the outer periphery is opposite to and spaced apart from an inner side wall of the border;

the damper extends from the lower surface to a gap remained between the outer periphery of the vibration plate and the inner side wall of the border.

2. The electronic device as described in claim 1, wherein the actuator is disposed on the lower surface, and an orthographic projection of the supporting portion on the lower surface does not overlap with an orthographic projection of the actuator on the lower surface.

3. The electronic device according to claim 2, wherein a ratio of a Young's modulus of the damper to a thickness of the damper in a vibration direction of the vibration plate is smaller than or equal to 2 MPa/mm.

4. The electronic device according to claim 2, wherein the actuator comprises a piezoelectric actuator and/or an electromagnetic actuator.

5. The electronic device as described in claim 1, wherein the damper is spaced apart from the border.

6. The electronic device according to claim 5, wherein a ratio of a Young's modulus of the damper to a thickness of the damper in a vibration direction of the vibration plate is smaller than or equal to 2 MPa/mm.

7. The electronic device according to claim 5, wherein the actuator comprises a piezoelectric actuator and/or an electromagnetic actuator.

8. The electronic device as described in claim 1, wherein the damper is glued and fixed to the vibration plate and the supporting portion, respectively.

9. The electronic device according to claim 8, wherein a ratio of a Young's modulus of the damper to a thickness of the damper in a vibration direction of the vibration plate is smaller than or equal to 2 MPa/mm.

10. The electronic device according to claim 8, wherein the actuator comprises a piezoelectric actuator and/or an electromagnetic actuator.

11. The electronic device according to claim 1, wherein a ratio of a Young's modulus of the damper to a thickness of the damper in a vibration direction of the vibration plate is smaller than or equal to 2 MPa/mm.

12. The electronic device according to claim 1, wherein a ratio of a Young's modulus of the damper to a thickness of the damper in a vibration direction of the vibration plate is smaller than or equal to 2 MPa/mm.

13. The electronic device according to claim 1, wherein a ratio of a Young's modulus of the damper to a thickness of the damper in a vibration direction of the vibration plate is smaller than or equal to 2 MPa/mm.

14. The electronic device according to claim 1, wherein the actuator comprises a piezoelectric actuator and/or an electromagnetic actuator.

15. The electronic device according to claim 1, wherein the actuator comprises a piezoelectric actuator and/or an electromagnetic actuator.

16. The electronic device according to claim 1, wherein the actuator comprises a piezoelectric actuator and/or an electromagnetic actuator.

17. The electronic device according to claim 1, wherein the actuator comprises a piezoelectric actuator and/or an electromagnetic actuator.

18. The electronic device according to claim 1, wherein the actuator is spaced apart from the frame.

* * * * *